United States Patent [19]

Wozniak

[11] Patent Number: 5,253,425
[45] Date of Patent: Oct. 19, 1993

[54] CYLINDRICAL SQUARING COLLET LEVELER FOR VERTICAL MILLING MACHINES

[75] Inventor: Gerard S. Wozniak, 3550 McCormick Ave., Brookfield, Ill. 60513

[73] Assignee: Gerard S. Wozniak, Brookfield, Ill.

[21] Appl. No.: 816,622

[22] Filed: Dec. 30, 1991

[51] Int. Cl.$^5$ .............. G01C 9/28; B23B 49/00; B23Q 17/22
[52] U.S. Cl. .................. 33/373; 33/533; 33/642
[58] Field of Search .............. 33/533, 632, 638, 641, 33/642, 644, 645, 370, 371, 372, 373, 502, 626, 535; 408/75, 116; 409/218

[56] References Cited

U.S. PATENT DOCUMENTS

| | | | |
|---|---|---|---|
| 3,763,570 | 10/1973 | Andersen | 33/642 X |
| 4,085,515 | 4/1978 | Darden | 33/642 X |
| 4,406,069 | 9/1983 | Clement | 33/642 |
| 5,154,001 | 5/1979 | Serafin | 33/373 |

*Primary Examiner*—Thomas B. Will

[57] ABSTRACT

An instrument used to establish precise perpendicular quill (32) alignment with respect to the work table of vertical milling machines with adjustable head assemblies (34). This instrument incorporates three basic tools into one device: (a) an internal cylindrical square; (b) a straight collet with flanged base; (c) a horizontal crosstest level with two vials at right angles to each other. This instrument is designed to be used on machines which have been set on concrete foundations, leveled, and then grouted to machine manufacturers specifications. The squaring process includes first setting the instrument flange (10) down on the work table directly under the quill (32). The quill is then telescoped into the collet bore (18) and the collet closing block (20) is then locked by bolt (20B). The position of the crosstest vial readings (24L) and (24F) are then noted and the head alignment bolts (30F) and (30A) are manipulated to establish a level condition. To this end, the base flange (10) is bolted to the work table (36) with bolts (10B) and head clamping bolts (28F) and (28A) being secured to establish perpendicular alignment.

3 Claims, 3 Drawing Sheets

CYLINDRICAL SQUARING COLLET LEVELER FOR VERTICAL MILLING MACHINES

BACKGROUND

1. Field of Invention

This invention relates to the necessity of establishing perpendicular quill and spindle alignment with respect to the work table of vertical milling, boring, and drilling machines with single or multiple axis adjustable heads.

2. Description of Prior Art

Milling is a process of material removal by a single point or multiple point rotating cutter. Most milling machines can be categorized into the following basic groups: (a) Knee and column type, (b) Bed type, (c) Rotary type, (d) Planer Type.

The Knee and column type milling machines are produced in three basic designs: (a) Vertical, (b) Horizontal, (c) Universal. These basic machine tools are utilized for both production and toolroom work because they are vesitile and relatively easy to operate. For many years these machines have been produced around the world, and up until about 60 years ago, these machines had fixed vertical and horizontal quills. The quill assembly contains the rotating spindle and can be extended or retracted into the milling machine's head assembly. During this period, machine tool manufacturers began to produce vertical knee type milling machines with adjustable angle heads. The vertical knee and column type mill with adjustable angle head allows the operator to mill, drill, ream, and bore material at compound angles. The advantage of the adjustable angle head is great in that it can be adapted to a variety of complex set-ups very quickly. One disadvantage, however, is that once the head is moved to accomodate angle type milling, the head and its respective quill assembly must be squared with respect to the work table of the mill in order to perform straight precision boring.

With reference to vertical quill alignment; currently it is accomplished by chucking a rigid "L" shaped rod of approximitly 15 mm in diameter and 100 mm in length on its minor length or chucking side, and 150 mm in length on its major length or indicator end.

A precision dial indicator of 0.0001" graduations is mounted to the end of the major length of the "L" shaped rod with the minor length chucked into the nose of the spindle. The support rod with dial indicator is then adjusted so that the indicator is "touched off" on the surface of the work table. The indicator is then rotated through 360° to show "total indicated run out" or T.I.R. on both the transverse axis or "y-axis", and longitudinal axis or "x-axis" of the table. By manipulation of the head adjustment and clamping bolts, a total indicated run out of zero on the face of the dial indicator is desirable, on both the transverse and longitudinal axis' of the table. Final head alignment is achieved by repeated rotation of the dial indicator over 360° and repeated manipulation of head adjustment bolts.

The previously described process is time consuming and requires a high degree of skill and concentration on part of the operator. This process takes between 30 to 45 minutes typically, and does not guarantee alignment of the head and its' respective quill assembly for the following reasion: After head alignment is achieved, the operator must then make final tightening of the head clamping bolts. Often upon final tightening, the head will move out of perpendicular alignment, and the operator must start the entire process from the begining.

An alternate method of spindle squaring is achieved by extending the quill assembly completly out and then locking it. A precision machinist square is then set upon the work table with the blade of the square set parallel to the outside of the quill along the longidudinal and transverse axis' of the table. The head clamping and adjustment bolts are manipulated until visual quill perpendicularity with respect to the square is achieved. This method usually provides unsatisfactory alignment of the quill for precision boring, and is not often used.

The last and least satisfactory method of perpendicalar quill alignment is made by adjusting the head collar with factory stamped hash marks on the side of that collar. This method again allows the mill to be used for roughing work only.

All of the previously discussed alignment problems are directly attributed to the inability to mechanically hold the head and its respective quill assembly square with respect to the work table while the head clamping bolts are secured. At best, only random success is achived without the ability to secure the quill and head before final clamping.

It is my belief after a rigorous search, that the present invention is completly unique, and there is no prior art directly germane to my invention. Prior alignment methods employed the use of common machine shop measuring instruments such as indicators, squares, rods, and wrenches.

OBJECTS AND ADVANTAGES

It is therefore a primary objective of the present invention to provide a means of holding the quill and head assembly in perpendicular alignment with respect to the work table of the milling machine while the head clamping bolts are secured to prevent head movement.

The above objective is accomplished through three individual steps by which perpendicular quill alignment is achived:

(a) To provide a rigid, perpendicular, precision bored collet, which is flange shaped at its base to provide clamping to work table, and split at its top to provide clamping around the outside diameter of the quill;

(b) To provide a cross test level to the outside of the collet body horizontally at the collet's middle and parallel to the flanged base of the collet to establish longitudnal and transverse quill perpendicularity;

(c) To provide bolt inlets in the flange base so that the base can be secured to the mill table, thus holding the quill and head assembly square.

Futher objects and advantages of this invention are that it is very quick to set up, convenient to use, durable, precise, and easy to understand.

Yet another advantage of this invention is that it can be used as a stand alone precision crosstest leveling device on any horizontal machine surface.

Still further objects and advantages will become apparent from consideration of the ensuing description and drawings.

DRAWING FIGUES

In the drawings, closely related members have the same number but different alphabetic suffixes. Also axis of orientation in each figure is denoted by double headed arrows and clearly labled.

DESCRIPTION

Figure 1:
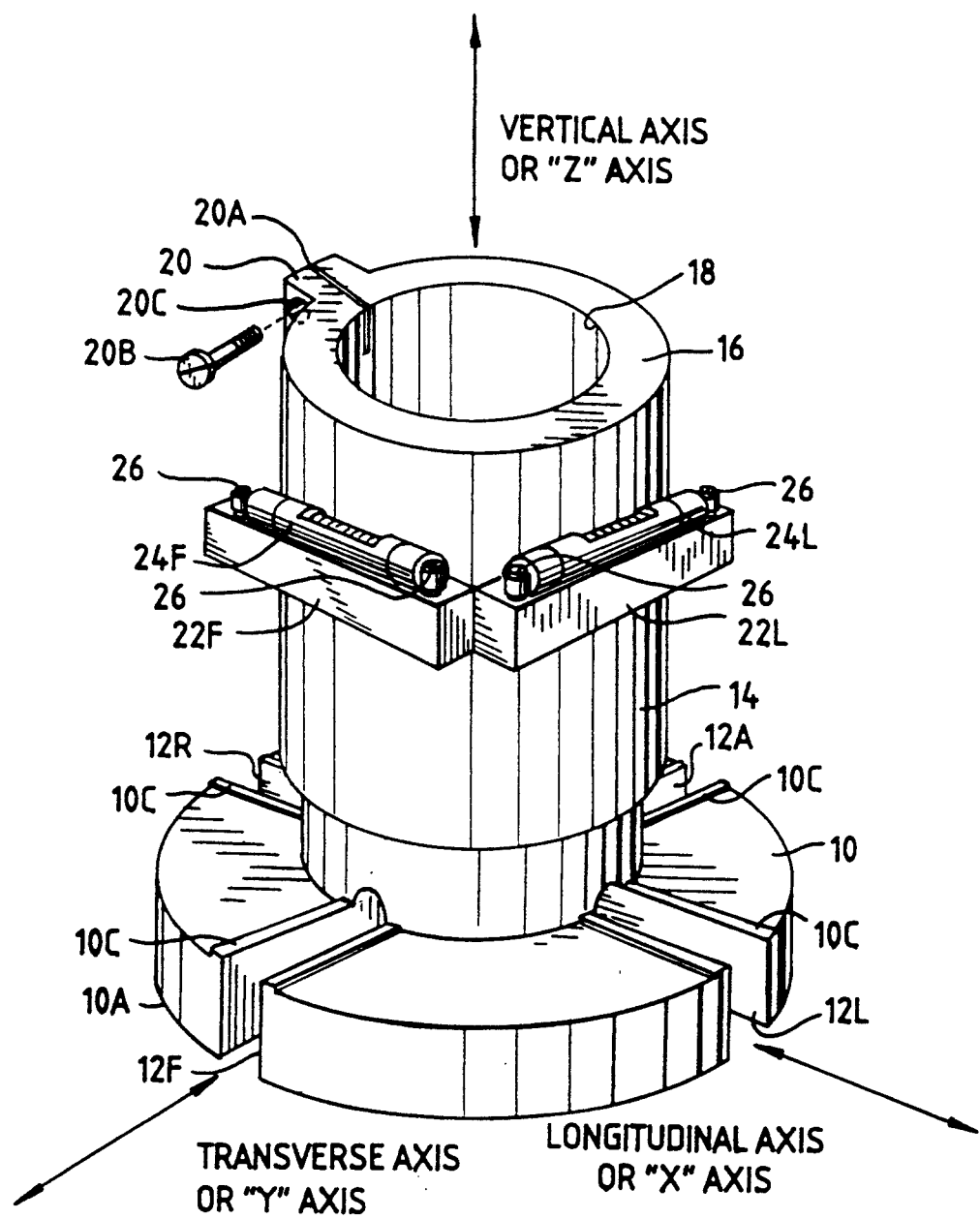
FIG. 1 shows a perspective view of cylindrical squaring collet from upper left hand side.

A typical embodiment of the cylindrical squaring collet of the present invention is illustrated in FIG. 1. The squaring collet has a flanged base 10 typically 200 mm in diameter and 30 mm in thickness, with four bolt inlets 12L, 12R, 12F, and 12A at 90° intervals. Bolt inlets 12L and 12R are parallel to longitudinal axis or y-axis, and bolt inlets 12F and 12A parallel to the transverse axis or x-axis. These bolt inlets facilitate clamping to milling machine work table 36. Work table shown in FIGS. 2 and 3.

The body of the collet 14 is typically 160 mm in height and 115 mm in diameter with a wall thickness 16 of approximately 20 mm and a bore 18 of variable diameter to accept various quill 32 diameters. The bore 18 of the collet body 14 is parallel to the vertical axis or z-axis. At the top right and parallel to the transverse axis of the collet body 14, is the collet closing block 20. The closing block facilitates closing of the top of the collet body around the quill of the milling machine. This collet block 20 is typically a cube 40 mm×40 mm×40 mm which is split 20A approximately 1 mm in width along the center of its vertical axis. This split 20A also extends vertically through the collet wall 16 down about 40 mm. The clamping block 20 has a threaded bolt hole 20C centered through its right front vertical face parallel to the transverse axis to accept collet closing bolt 20B.

Approximately half way or 80 mm up the outside of the collet body 14 are the level vial mounting blocks 22L and 22F. The blocks are rectangular in shape with a vertical thickness of about 20 mm and a length of about 130 mm with a variable horizontal width of 25 mm to 45 mm, due to the circumference of the outside collet body 14. The left block 22L is parallel to the transverse axis and centered horizontally above left bolt inlet 12L. The fore block 22F is parallel to the longitudinal axis and centered horizontally above bolt inlet 12F.

Centered horizontally on top of vial mounting blocks 22L and 22F are ground and graduated leveling vial assemblies 24L and 24F. These vial assemblies have a tube diameter of 18 mm and are 90 mm in length. Vial assembly 24L is mounted on top of block 22L and parallel to transverse axis. Vial assembly 24F is mounted on top of block 22F and parallel to longitudinal axis. The vial assemblies have mounting ears at each end to facilitate mounting and adjustment through use of screws 26. Vial assemblies 24L and 24F are adjustable to zero setting with respect to bottom surface of flanged base 10A by adjustment of vial mounting screws 26. Vial assemblies 24L and 24F are available through the L. S. Starrett Co. of Athol, Mass. and have five graduations of 100 seconds or 0.005"/ft.

The entire collet, including flanged base 10, collet body 14, collet closing block 20, and vial mounting blocks 22L and 22F comprise a single casting. This casting is made of A.S.T.M. sp. A76-class 35 gray iron. This is a machine tool grade cast iron which is both strong and readily machined. This casting is also normalized to prevent wrapage upon machining.

The machine work on the casting is comprised of several steps: First, The bottom surface of the flanged base 10A is ground flat and then hand scraped to "surface plate" quality. This step is important because it establishes the "foundation" of the tools accuracy, namely a precise flat plane. The second step is to center and bore the internal diameter 18 of the collet from the top down approximately 150 mm. This machining step is accomplished on a vertical "bed type" jig boring mill. The internal diameter of the collet 18 is bored to 0.003 mm larger than the diameter of the quill assembly the collet is to be used on. This step establishes a precise machine "slip fit" and also establishes precision perpendicular alignment of collet bore 18 with respect to ground and scraped base 10A.

The third step is to horizontally drill and tap collet closing block 20 and relieve threads approximately 20 mm through the front face of closing block 20 to prevent bolt 20B thread binding. The threads should be relieved up to collet split line 20A.

The fourth step is to machine the collet block split 20A. The split is 1 mm in width and extends down 40 mm vertically through the top center of closing block 20 and collet wall 16. This step is accomplished on a horizontal mill.

The fifth step is to drill and tap holes for vial mounting screws 26 on top of each end of vial mounting blocks 22L and 22F. These holes (four in all) are drilled on approximately 45 mm centers vertically through the top of blocks 22L and 22F to facilitate mounting and adjustment of vial assemblies 24L and 24F. This step is performed on a drill press.

The sixth step is to face mill the top of bolt inlet seats 10C (four in all) directly above bolt inlets 12L, 12R, 12F, and 12A. This step facilitates square bolt seating above those inlets. This step is performed on a vertical mill.

OPERATION—FIGS. 2 AND 3

Figure 2:
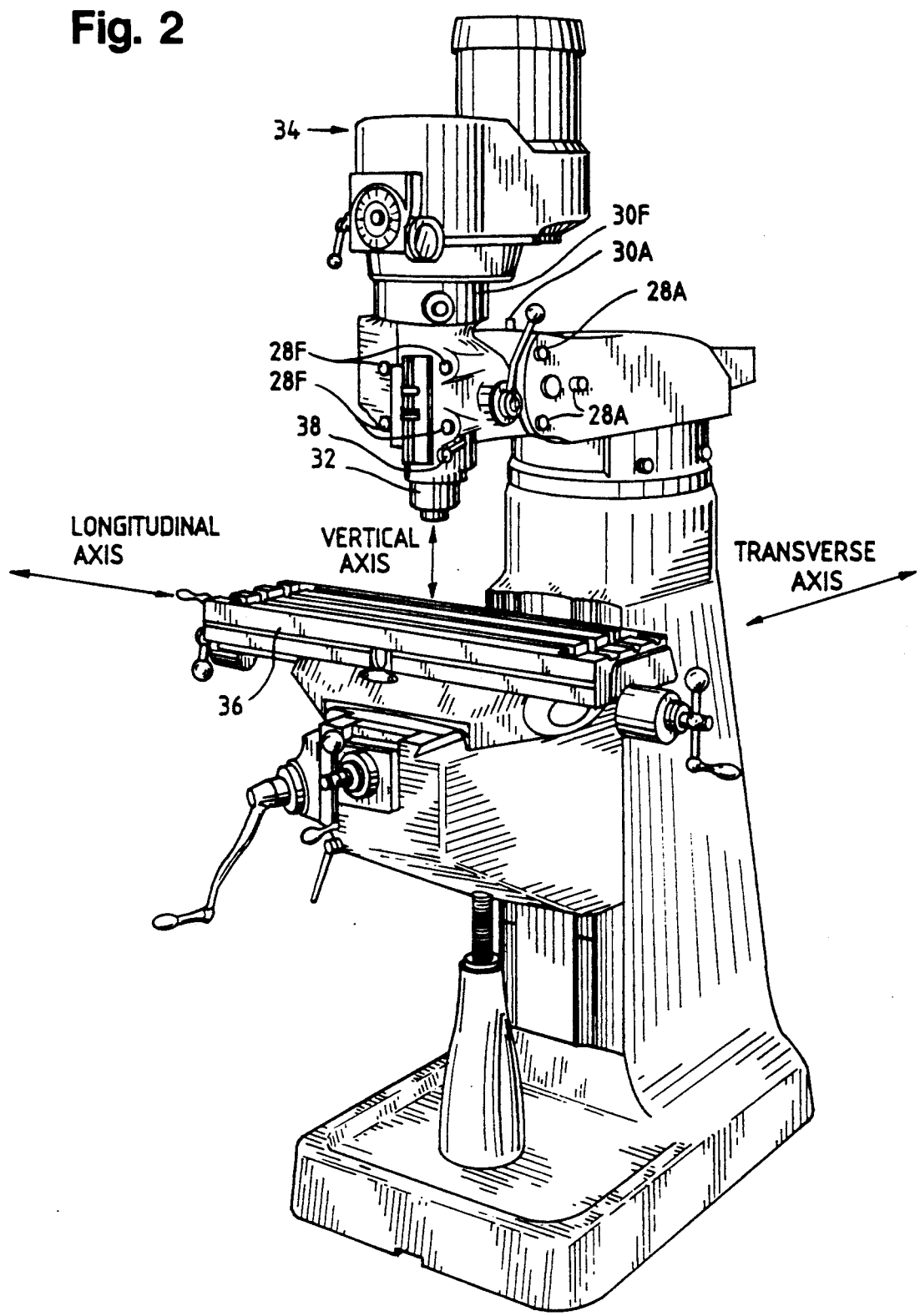
FIG. 2 shows a perspective view of a typical knee and column type vertical milling machine with adjustable head and its respective head clamping and adjustment bolts.

FIG. 2 shows a perspective view of a typical vertical milling machine with adjustable head assembly; on which squaring collet is used. Also shown in FIG. 2 and refered to in further drawings, are the head clamping bolts 28F and 28A. Also shown are head adjustment bolts 30F and 30A, longitudinal axis (x-axis), transverse axis (y-axis), vertical axis (z-axis), quill assembly 32, table 36, and head assembly 34. I thought it would be helpful to see the mill in its entirety so that the various axis' of the machine and its overall design could become more apparent.

Figure 3:
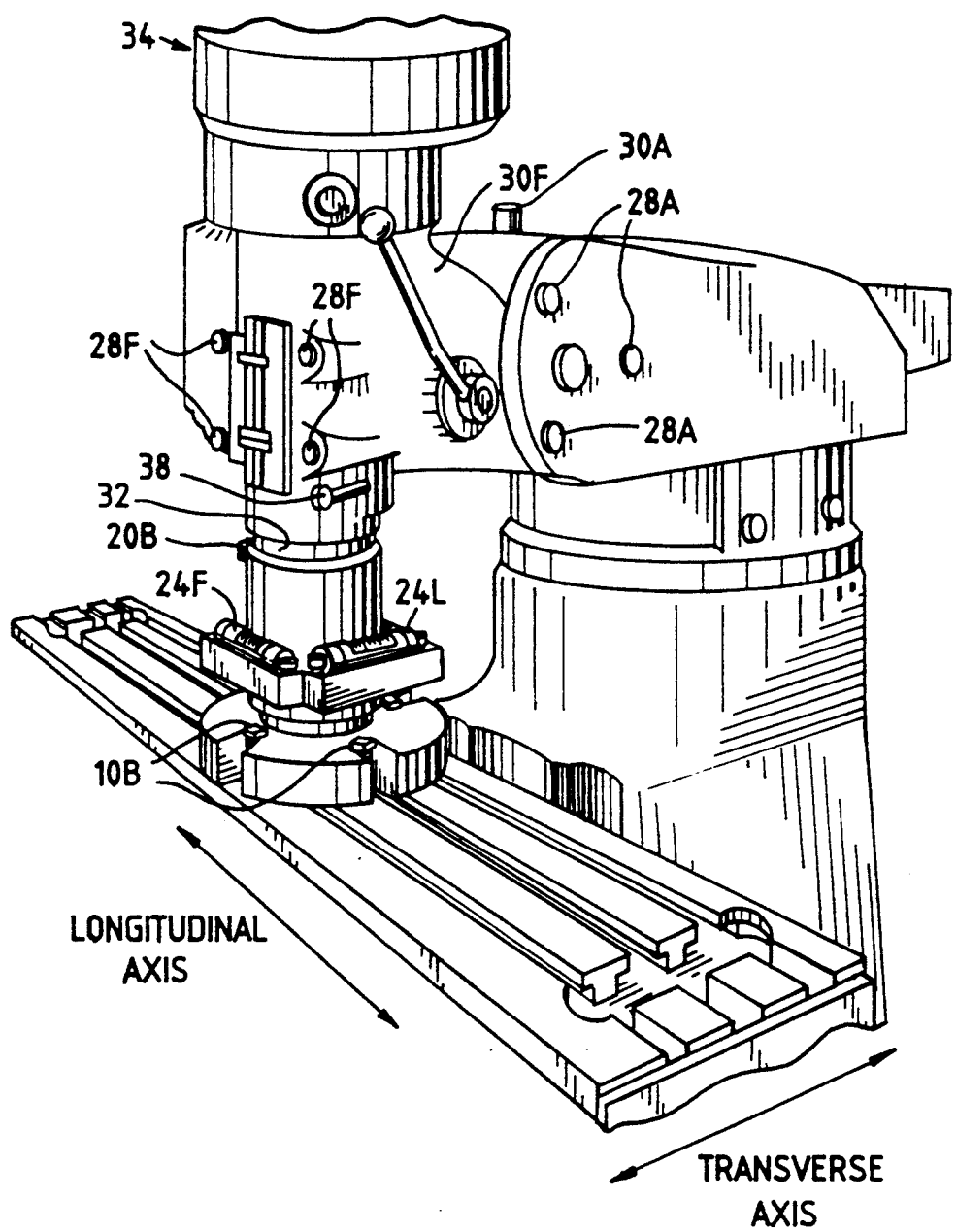
FIG. 3 shows a perspective view of cylindrical squaring collet mounted on the table of vertical milling machine with quill centered over top of squaring collet.

The manner of using the squaring collet, as shown in FIG. 3, is by placing the collet upright directly under the quill 32 on top of and centered on the machine's work table 36. The first step is to orient the collet so that leveling vial 24L is parallel to transverse axis and leveling vial 24F is parallel to longitudinal axis of table 36. Both vials 24L and 24F should show no inclination in the longitudinal and transverse axis'. This condition indicates that the milling machine has been properly leveled when it was installed. If the leveling vials 24L and 24F show inclination or an out of levelcondition the bubble readings on each vial should be carefully viewed and recorded for later use in this special condition.

The second step is to run the quill assembly 32 down vertically into the collet bore 18 about 140 mm. Care should be taken in this step so that the outside of the quill 32 surface and inside surface of the collet bore 18 are not scratched. The two should be "eased" together slowly by hand to avoid binding. After quill 32 is inside of collet bore 18, closing bolt 20B is tightened to lock collet body 14 around quill 32. Next, quill lock 38 is tightened to secure quill 32 in the milling machines head assembly 34.

With head clamping bolts 28F and 28A slightly loosened; the third step is to manipulate head adjustment bolt 30F to produce an exact level reading on vial 24F along longitudinal axis. Next, head adjustment bolt 30A is manipulated to produce an exact level reading on vial 24L along transverse axis.

In the special case of an out of level machine table 36; head adjustment bolts 30F and 30A should be adjusted to duplicate the vial readings 24F and 24L previously recorded. In both cases the important objective is to use the vial readings to establish vertical quill 32 alignment with respect to work table 36.

The fourth step is to loosen quill lock 38 so that quill 32 is free to vertical movement. Next, table bolts 10B (four in all) are fed through bolt inlets 12L, 12R, 12F, and 12A and secured to mill table 36 with "T" nuts in table slots.

The fifth step is to tighten head clamping bolts 28F and 28A. This step locks the head and quill assembly in precision perpendicular alignment with respect to work table.

The sixth, and last step is to loosen collet clamping bolt 20B and retract quill assembly 32 out of collet bore 18. With quill squaring process now complete, bolts 10B (four in all) can be removed and squaring collet can be taken off of table. The mill is now ready for precision vertical boring.

I claim:

1. A squaring device for locating perpendicular alignment between a spindle assembly of a machine tool and its work surface, comprising: an elongated collet, having a top and a bottom, and a bore for accepting said spindle assembly of said machine tool, a slit extending through said collet extending downwards from said top of said collet, means for closing said slit to secure said collet around said spindle assembly, a pair of horizontal level vial platforms located on the outside of said collet perpendicular to each other in a horizontal plane, a flanged base at the bottom of said collet in precise perpendicular alignment to said bore of said collet, said flanged base having a plurality of bolt inlets equally spaced around the circumference of said base to actuate holding said collet and said spindle assembly to said work surface, and a pair of precision level vials, one mounted on top of each of said level vial platforms.

2. The device of claim 1 wherein said level vials are arranged generally parallel to the longitudinal axis and transverse axis, respectively, of said work surface on said vial platforms.

3. The device of claim 1 wherein said pair of level vials are adjustably mounted on said vial platforms to permit precise perpendicular alignment with said bore of said collet and said spindle assembly.

* * * * *